April 8, 1930.  W. L. TAYLOR  1,753,874
ONION HARVESTER
Filed Feb. 23, 1928   3 Sheets-Sheet 3
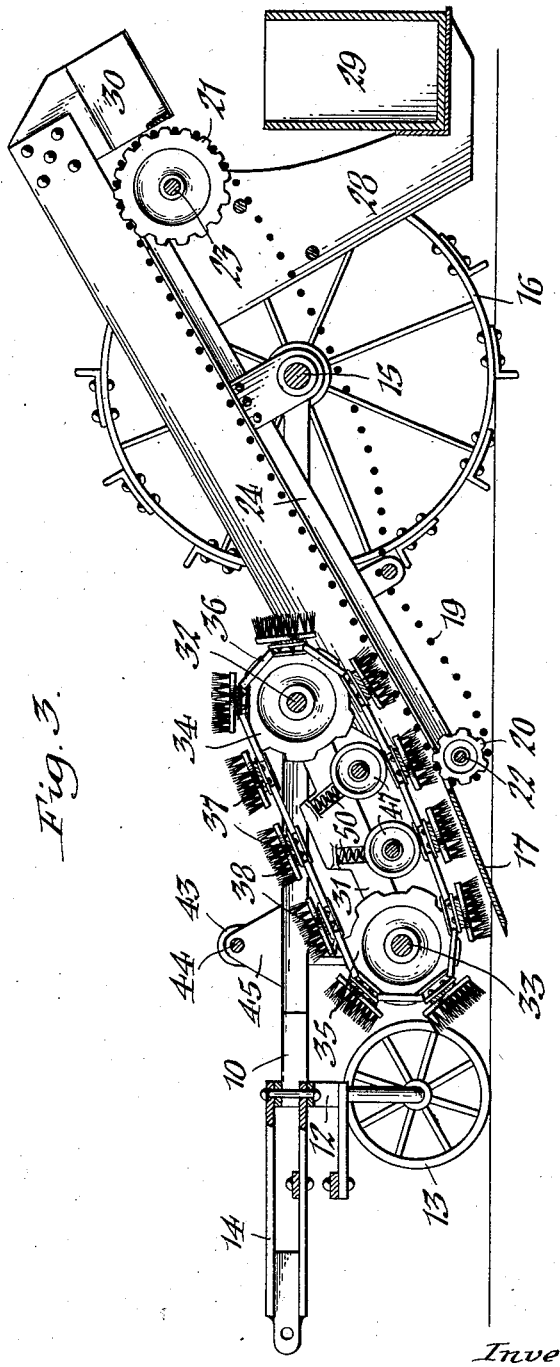
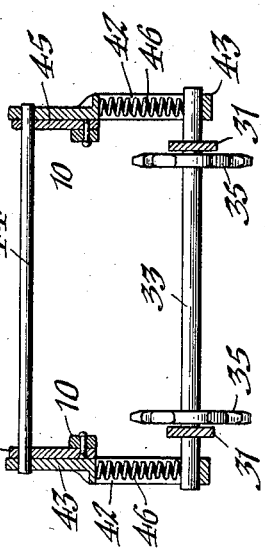
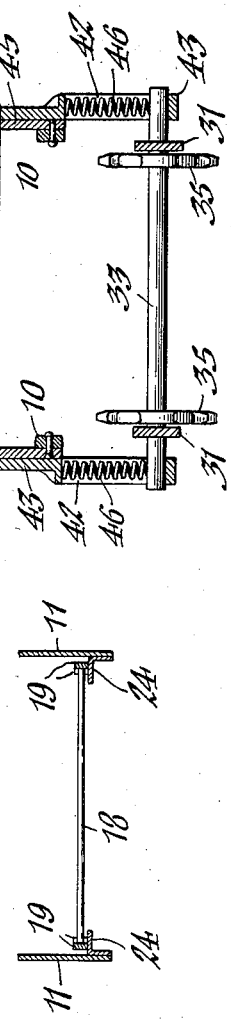

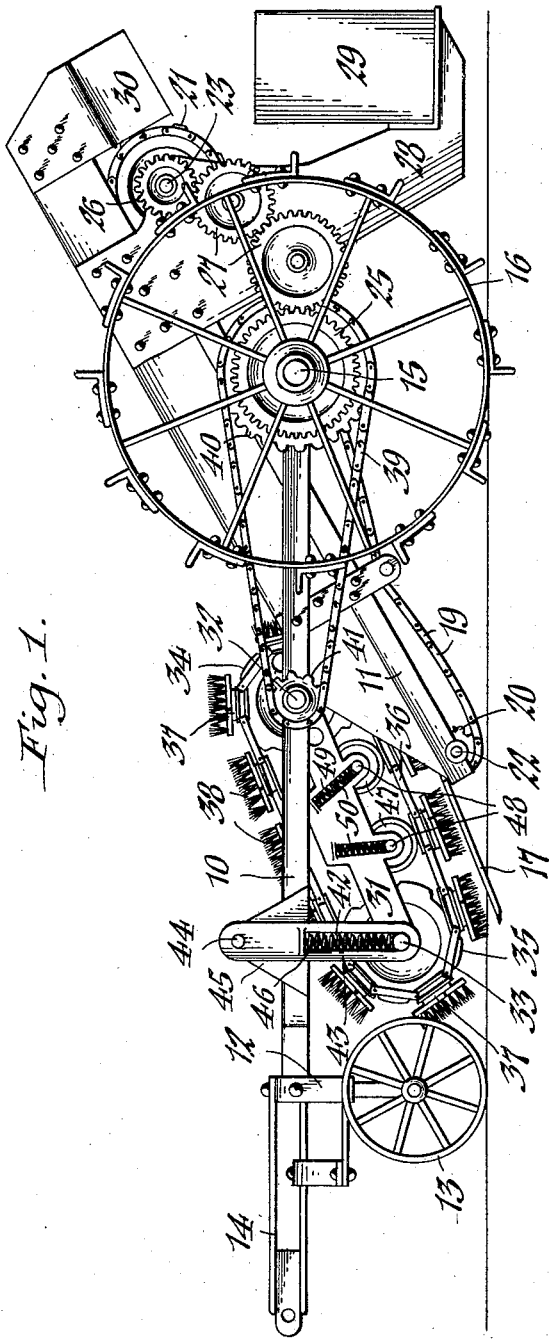

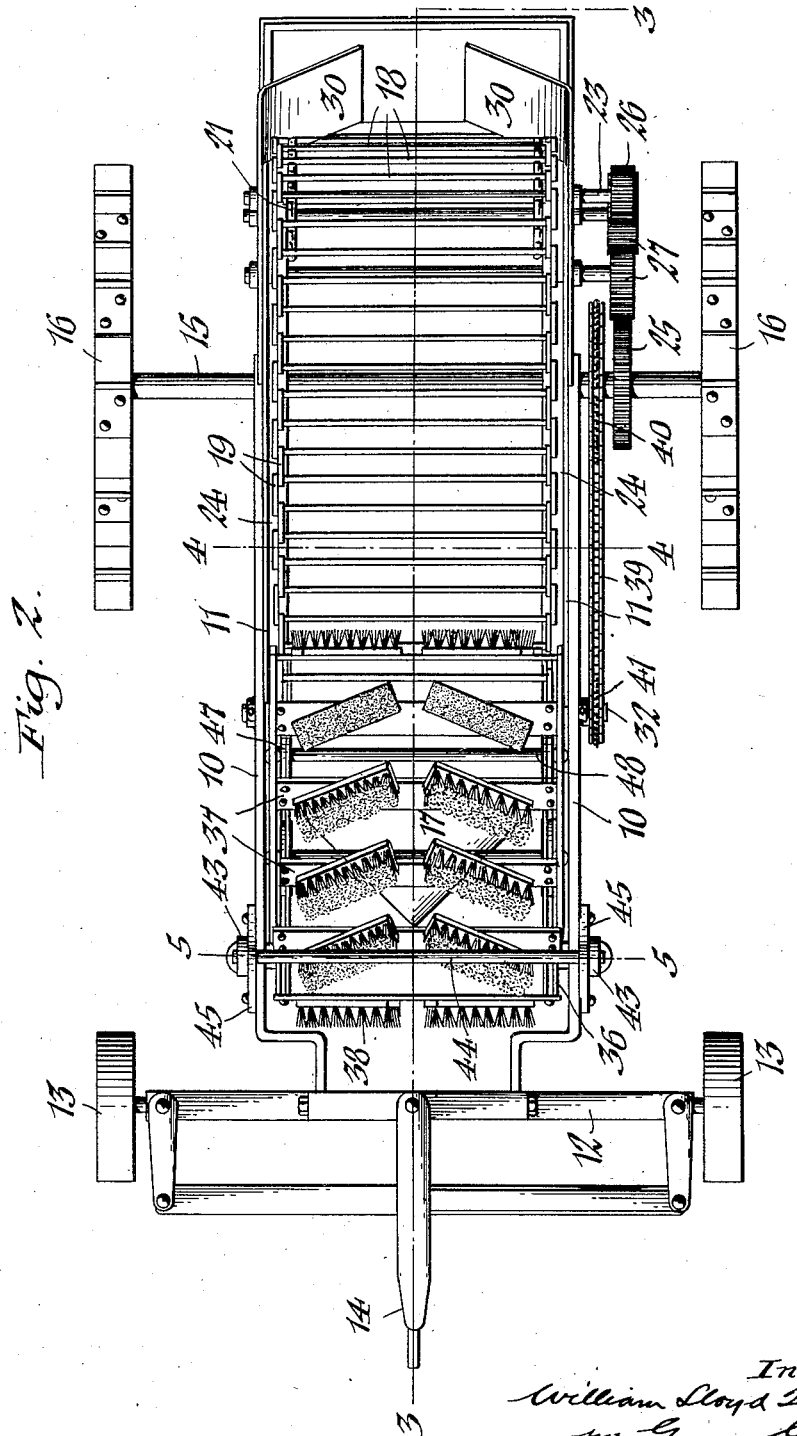

Patented Apr. 8, 1930

1,753,874

UNITED STATES PATENT OFFICE

WILLIAM LLOYD TAYLOR, OF ELBA, NEW YORK

ONION HARVESTER

Application filed February 23, 1928. Serial No. 256,241.

This invention relates to a machine for harvesting onions.

Its chief object is the provision of a machine of this character which is reliable and efficient in operation, and which will expeditiously dig the onions out of the ground and separate the earth and weeds therefrom, the onions being delivered into crates or other receptacles placed at the rear end of the machine.

Another object of the invention is to provide the machine with positive means for effectively propelling the onions past the digging point and for removing the soil and other foreign matter therefrom.

A still further object is the provision of a simple and inexpensive onion harvester which is designed for operating in single rows, which has a minimum draft, and which will operate effectively under varying conditions.

In the accompanying drawings:—

Figure 1 is a side elevation of an onion harvester embodying my invention. Figure 2 is a top plan view thereof. Figure 3 is a central longitudinal section thereof taken in the plane of line 3—3, Figure 2. Figures 4 and 5 are transverse sections taken in the plane of the correspondingly numbered lines in Figure 2.

Similar characters of reference indicate corresponding parts throughout the several views.

The main frame of the machine upon which its working parts are mounted is indicated at 10, 11, and located at the front of this frame is an axle 12 to which the steering wheels 13 are connected, the draft rod 14 being joined to these members in the manner shown. Journaled at the rear end of the frame is the axle 15 on which the traction wheels 16 are mounted. As shown in Figures 1 and 3, the frame members 10 are substantially horizontal while the frame members 11 are inclined rearwardly and extend from a point forwardly and below the rear axle to a point rearwardly and above the same. This machine has been particularly designed for digging a single row of onions at a time and to this end the center of the machine travels over the row to be harvested and the front and rear wheels are so spaced as to straddle three rows of onions, viz; the one being worked and those two immediately adjoining that row on either side thereof.

Attached to and projecting from the lower front end of the inclined frame members 11 is a pointed plow 17 of any suitable construction which is adapted to enter the ground at a slight angle and dig the onions therefrom on to a suitable rearwardly inclined elevator or conveyor disposed between the frame members and extending from a point immediately in rear of the plow to the rear end of the machine. The preferred type of elevator consists of a plurality of spaced transverse bars 18 joined at their ends to one another by links 19 and passing around front and rear sprocket wheels 20, 21 fixed on the ends of transverse shafts 22, 23, respectively, journaled in suitable bearings applied to the frame members 11. Angle bars 24 secured to the inner sides of said frame members serve to support the upper stretch of the conveyor, the links 19 thereof engaging the top sides of such bars. As the onions are carried rearwardly by the elevator, the loose soil and weeds pass readily through the spaces between the elevator bars 18. This elevator is driven from the rear axle 15 through the medium of gears 25 and 26 fixed on the axle and the rear elevator-shaft 23, respectively, and interposed idle gears 27.

At its rear end and below the discharge end of the elevator, the machine has a platform 28 for supporting a crate or like receptacle 29 into which the onions are discharged. Side guards 30 applied to the rear end of the machine guide the onions into the receptacle.

Means are provided at the front end of the machine and directly over the plow 17 for positively and effectually moving the onions past the latter on to the elevator so that the machine can travel at a uniform speed without liability of its becoming clogged. To this end the following mechanism is employed, which, in addition to the function just described, thoroughly removes the dirt from the onions, so that when they are discharged from the machine they are practically ready for the market:—

31, 31 indicate the longitudinally-disposed side arms of a vertically-swinging frame which are fulcrumed at their rear ends on a transverse shaft 32 journaled in the horizontal member 10 of the main frame of the machine, and which extend over the plow and the adjoining front end of the elevator 18. Journaled in the free, front ends of these arms is a transverse shaft 33 and fixed on the latter and said companion shaft 32 are sprocket wheels 34, 35 over which passes an endless feed belt 36 whose lower stretch is adapted to engage the onions as they are dug up by the plow and thereby direct and assist them on to the elevator. This belt may be of any suitable construction, that shown in the drawings including transverse bars or slats 37 disposed at suitable intervals around the same and secured to these bars are brushes 38 which are preferably arranged in rows in the manner shown in Figure 2. The belt is driven from the rear axle of the machine by a chain 39 passing around sprocket wheels 40 and 41 secured to the axle and the shaft 32. Aside from affording an effective means for propelling the onions without injury rearwardly over the plow, these brushes keep turning the onions over and thoroughly remove the soil and other foreign matter adhering to them, and prevent the onions from creeping out at the sides of the plow.

As shown in Figures 1 and 3, the belt-carrying frame 31, 31 normally assumes an inclined position substantially parallel with the plow 17 and the elevator 18, and the lower ends or tips of the brushes are spaced a suitable distance from said parts. The front of this frame has the ends of its shaft 33 guided in upright slots 42 formed in pendant arms 43 fulcrumed at 44 to brackets 45 attached to the frame members 10. Springs 46 fitted in the guide slots and bearing on the shaft-ends normally, hold the latter against the bottoms of the slots and yieldingly permit the belt carrying frame to rise and fall as required during the passage of the onions through the machine and thereby exert sufficient pressure to compel the feeding of the onions over the plow onto the elevator. Supplementary pressure rollers 47 are also provided which engage the lower stretch of the belt 36 intermediate its driving sprockets 34, 35 and which are mounted on the ends of shafts 48 guided in slots 49 in the frame-arms 31. Springs 50 contained in these slots yieldingly resist the upward thrust of the belt imparted to it by the onions as they pass beneath it.

As the machine is drawn over the field by a tractor and in line with a single row of onions, the plow 17 digs them out of the ground and the feed belt 36 and its brushes 38 positively propel the onions rearwardly over the plow on to the elevator 18, which conveys them to the rear of the machine where they are discharged by gravity into the receptacle 29. When the latter is filled an attendant removes it and places another one on the platform 28. In propelling the onions over the surface of the plow, the brushes 38 assist in removing the soil and other foreign matter therefrom and as they are carried upwardly and rearwardly by the elevator the loose soil and weeds fall through the spaces between the elevator-bars.

It is preferable that the speed of the elevator be faster than that of the feed belt 36, so that as the onions are delivered by the latter onto the former they are carried away at a rate of speed which will avoid clogging of the machine.

I claim as my invention:—

1. An onion harvester, comprising a plow, an elevator extending rearwardly from said plow, an endless feed belt arranged over the plow and the adjoining end of the elevator for propelling the onions over said plow onto said elevator, said belt having its lower stretch parallel with the top face of the plow and extending from a point in advance of the plow to a point slightly beyond the front end of the elevator, and brushes applied to said endless belt.

2. An onion harvester, comprising a plow, an elevator extending rearwardly from said plow, a frame disposed over the plow for movement toward and from the same, an endless belt journaled in said frame and having its lower stretch disposed in opposing parallel relation to and overlying the full length of the plow for engaging the onions and propelling them onto the elevator, and brushes mounted on the surface of said belt.

3. An onion harvester, comprising a frame, a plow arranged at the front end thereof, an elevator extending rearwardly from said plow, vertically-swinging supports fulcrumed at their rear ends to said frame at a point above the plow, shafts arranged at the front and rear ends of said supports, the rear shaft being journaled in the frame and constituting a fulcrum for the supports, sprockets fixed on said shafts, an endless feed belt engaging said sprockets and having its lower stretch disposed over the plow and part of the elevator to propel the onions across the plow onto the elevator, pendant arms fulcrumed to swing vertically on said frame and having guide ways for receiving the ends of said front feed belt shaft, and means applied to said arms for yieldingly resisting the upward swinging movement of the feed belt supports.

4. An onion harvester, comprising a frame, a plow arranged at the front end thereof, an elevator extending rearwardly from said plow, vertically-swinging supports fulcrumed at their rear ends to said frame at a point above the plow, shafts arranged at the front and rear ends of said supports, the rear shaft being journaled in the frame and constituting a fulcrum for the supports, sprockets fixed on said shafts, an endless feed belt engaging said sprockets and having its lower stretch disposed over the plow and part of the elevator to propel the onions across the plow onto the elevator, pendant arms fulcrumed on said frame and having guide ways for receiving the ends of said front feed belt shaft, means applied to said arms for yieldingly resisting the upward swinging movement of the feed belt supports, and supplementary means mounted on said supports between their shafts for yieldingly resisting the upward movement of the intermediate lower stretch of the feed belt.

WILLIAM LLOYD TAYLOR.